United States Patent
Jangam et al.

(10) Patent No.: US 11,368,353 B2
(45) Date of Patent: Jun. 21, 2022

(54) CONTEXT-AWARE SOFTWARE DEFINED NETWORKING POLICY MANAGEMENT AND ENFORCEMENT USING SEMANTIC DATA MODELING

(71) Applicant: Cisco Technology, Inc., San Jose, CA (US)

(72) Inventors: Anil Bhikuayya Jangam, Milpitas, CA (US); Om Prakash Suthar, Bolingbrook, IL (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 16/172,754

(22) Filed: Oct. 27, 2018

(65) Prior Publication Data

US 2020/0136888 A1 Apr. 30, 2020

(51) Int. Cl.
| | |
|---|---|
| *G06F 16/00* | (2019.01) |
| *H04L 41/02* | (2022.01) |
| *H04L 41/0893* | (2022.01) |
| *G06F 16/28* | (2019.01) |
| *G06F 16/2455* | (2019.01) |

(52) U.S. Cl.
CPC ........ *H04L 41/024* (2013.01); *G06F 16/2455* (2019.01); *G06F 16/28* (2019.01); *H04L 41/0893* (2013.01)

(58) Field of Classification Search
CPC ............... H04L 41/024; H04L 41/0893; H04L 41/5096; G06F 16/28; G06F 16/2455
See application file for complete search history.

(56) References Cited

U.S. PATENT DOCUMENTS

| | | | |
|---|---|---|---|
| 9,450,895 B2 | 9/2016 | Strassner | |
| 9,667,653 B2* | 5/2017 | Barabash | ............ H04L 41/0893 |
| 10,693,738 B2* | 6/2020 | Nagarajan | ........... H04L 41/0853 |
| 2002/0178246 A1* | 11/2002 | Mayer | ..................... H04L 41/12 709/223 |
| 2014/0279808 A1* | 9/2014 | Strassner | ............... G06Q 10/10 706/47 |

(Continued)

FOREIGN PATENT DOCUMENTS

WO 2013123445 A1 8/2013

OTHER PUBLICATIONS

Dersingh et al., "Context-Aware Access Control Using Semantic Policies", Jun. 4, 2014, pp. 1-14 (Year: 2014).*

(Continued)

*Primary Examiner* — Jared M Bibbee
(74) *Attorney, Agent, or Firm* — Patterson + Sheridan, LLP

(57) ABSTRACT

Techniques for policy management and enforcement using semantic data modeling are provided. A first declarative policy is received at a network node from a controller. A first semantic data query protocol (SDQP) transaction is generated by retrieving a first semantic data model associated with the network node, where the first semantic data model describes a configuration domain of the network node, and parsing the first declarative policy based on the first semantic data model to generate the first SDQP transaction. The first declarative policy is then implemented by executing the first SDQP transaction against a semantic database.

20 Claims, 7 Drawing Sheets

(56) References Cited

U.S. PATENT DOCUMENTS

| | | | | |
|---|---|---|---|---|
| 2016/0173535 A1* | 6/2016 | Barabash | ............ | H04L 41/0893 726/1 |
| 2020/0067774 A1* | 2/2020 | Saltsgaver | .......... | H04L 41/0856 |

OTHER PUBLICATIONS

Kodeswaran et al., "Content and Context Aware Networking Using Semantic Tagging", IEEE, pp. 1-10 (Year: 2006).*

Omer Berat Sezer, Erdogan Dogdu, Ahmet Murat Ozbayoglu, "Context Aware Computing, Learning and Big Data in Internet of Things: A Survey," IEEE., 2017, pp. 2327-4662.

Tayyaba et al., "Software-Defined Networks (SDNs) and Internet of Things (IoTs): A Qualitative Prediction for 2020," International Journal of Advanced Computer Science and Applications, vol. 7, No. 11, 2016, 20 pages.

Hamid Haidarian Shahri*, James A Hendler, Adam A Porter,"Software Configuration Management Using Ontologies," MINDSWAP Research Group, Department of Computer Science, University of Maryland, 13 pages.

Martinez et al., "An Ontology-Based Information Extraction System for bridging the configuration gap in hybrid SDN environments," IEEE, Jul. 2, 2015, 9 pages.

Nartich Na-Lampang and Wiwat Vatanawood, "Development of an ontology-based configuration management system," ECAI 2016—International Conference—8th Edition, Electronics, Computers and Artificial Intelligence, Jun. 30-Jul. 2, 2016, 6 pages.

Meshkova et al., "Modeling the home environment using ontology with applications in software configuration management," IEEE, Jul. 2008 [Abstract Only] [Accessed Online Oct. 17, 2018] <https://ieeexplore.ieee.org/document/4652663/>.

* cited by examiner

CONTEXT-AWARE SOFTWARE DEFINED NETWORKING POLICY MANAGEMENT AND ENFORCEMENT USING SEMANTIC DATA MODELING

TECHNICAL FIELD

Embodiments presented in this disclosure generally relate to software defined networking. More specifically, embodiments disclosed herein relate to use of semantic data modeling to improve policy management, configuration, and enforcement in software defined networks.

BACKGROUND

Software defined networking (SDN) has become increasingly common. Typically, an SDN topology separates the control plane of network nodes (e.g., switches, routers, gateways, and the like) from the forwarding plane, utilizing one or more controllers. In some topologies, network configurations have been abstracted to be policy-based. For example, the controller pushes declarative policies to each node, and the individual nodes determine and implement the actual configurations required to implement the policy. However, this configuration is still deployed using discrete managed objects (MO) through command-line interfaces (CLI), representational state transfer (REST) interfaces, or other methods. Often, there is inconsistency between the declared configuration from the controller and the actual configuration implemented by the nodes. Moreover, current systems which treat the configuration as discrete or disaggregated MO can result in non-optimized or redundant configurations, data consistency issues, performance degradation due to slow information retrieval caused by requiring multiple MO queries for the same type of network resource, and inextensibility because the relationships between information elements is complex and unknown.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
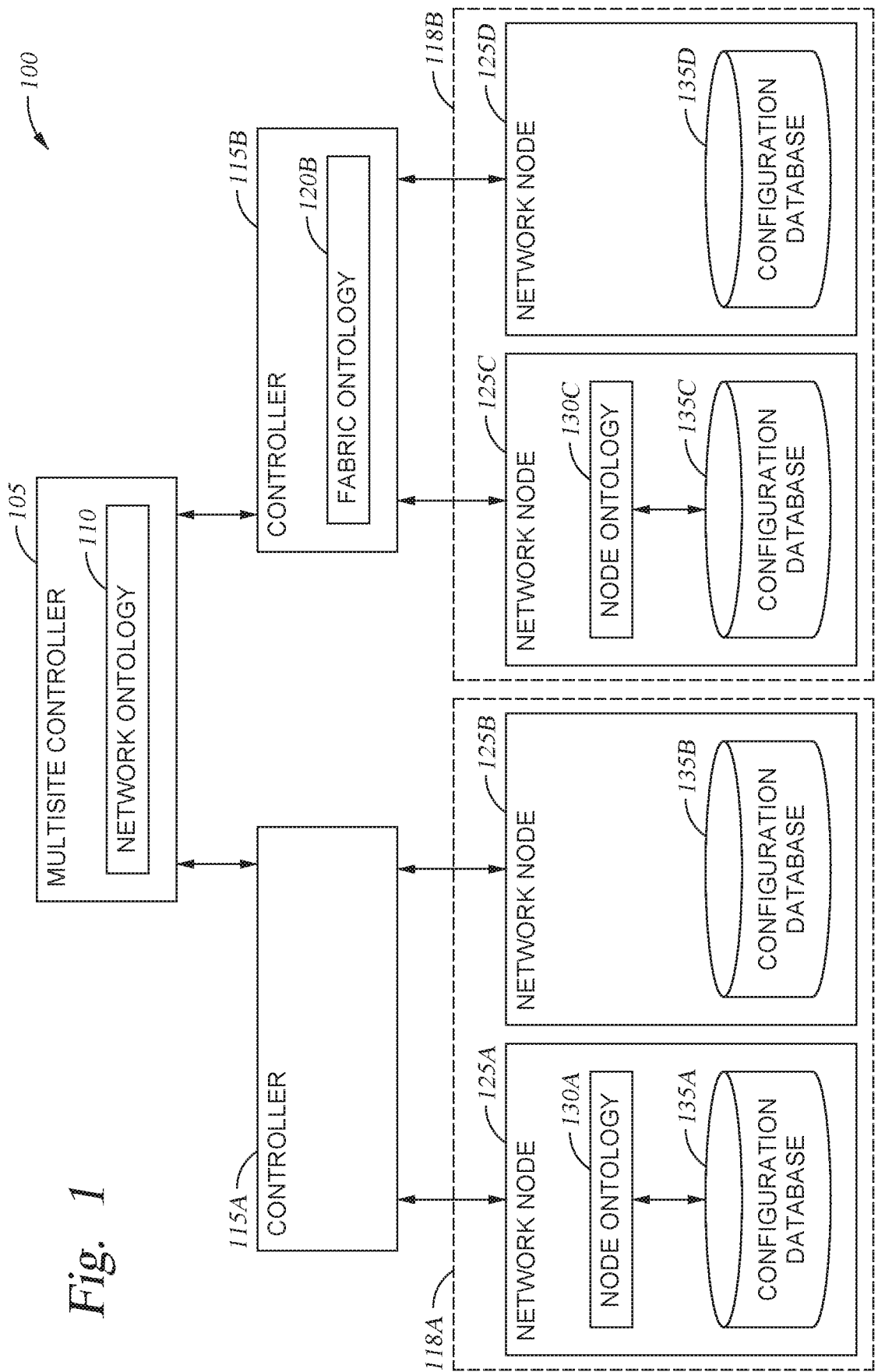
FIG. 1 illustrates a network topology configured to use semantic data modeling to manage and enforce network policies, according to one embodiment disclosed herein.

One embodiment presented in this disclosure provides a method. The method includes receiving, at a network node, from a controller, a first declarative policy. The method further includes generating a first semantic data query protocol (SDQP) transaction by retrieving a first semantic data model associated with the network node, wherein the first semantic data model describes a configuration domain of the network node, and parsing the first declarative policy based on the first semantic data model to generate the first SDQP transaction. Finally, the method includes implementing the first declarative policy by executing the first SDQP transaction against a semantic database.

A second embodiment presented in this disclosure provides a network node including one or more computer processors, and a memory containing a program which when executed by the one or more computer processors performs an operation. The operation includes receiving, from a controller, a first declarative policy. The operation further includes generating a first semantic data query protocol (SDQP) transaction by retrieving a first semantic data model associated with the network node, wherein the first semantic data model describes a configuration domain of the network node, and parsing the first declarative policy based on the first semantic data model to generate the first SDQP transaction. Finally, the method includes implementing the first declarative policy by executing the first SDQP transaction against a semantic database.

A third embodiment presented in this disclosure provides a computer product comprising logic encoded in a non-transitory medium, the logic executable by operation of one or more computer processors to perform an operation. The operation includes receiving, at a network node, from a controller, a first declarative policy. The operation further includes generating a first semantic data query protocol (SDQP) transaction by retrieving a first semantic data model associated with the network node, wherein the first semantic data model describes a configuration domain of the network node, and parsing the first declarative policy based on the first semantic data model to generate the first SDQP transaction. Finally, the method includes implementing the first declarative policy by executing the first SDQP transaction against a semantic database.

Example Embodiments

Embodiments of the present disclosure improve consistency, efficiency, latency, and extensibility of networks and network configuration by generating and using semantic data models to represent the meaning and relationships between objects and configurations. In embodiments, the semantic model captures the relationships between configuration elements (e.g., MOs), which enables the use of a more simplified query mechanism. This improves the functioning of the network, as well as of the network controllers and nodes in the network, as configuration consistency is improved, and latency and performance degradation are reduced due to the simplified query mechanism.

In one embodiment, semantic data modeling is used to provide a clear, consistent, and unambiguous framework for a configuration domain of a network, fabric, or node. In the present disclosure, the semantic model that captures the configuration objects and relationships between them is alternately referred to as a semantic data model, an ontology, or a knowledge map. In some embodiments, in addition to constructing the semantic data model based on the known configuration objects, rules, constraints, and relationships, techniques disclosed herein also generate inferences regarding additional relationships or constraints, and capture these additional inferences in the ontology.

In some embodiments, in addition to node-level ontologies representing objects, classes, instances, and relationships at the level of individual nodes, ontologies are similarly constructed to represent a broader fabric (e.g., a defined set or group of nodes, often controlled by a common control plane or controller). Further, in some embodiments, one or more ontologies are constructed at the level of the broader network (e.g., including two or more fabrics or sites). In this way, embodiments of the present disclosure provide a consistent view and knowledge of system configuration at various levels of the network topology, which results in improved policy implementation, management, and enforcement. Additionally, in some embodiments, semantic-aware nodes (e.g., controllers and nodes that include one or more knowledge maps) can also interact with ordinary devices, and translate semantic policies into declarative or imperative policies, as well as declarative policies into semantic policies. In one embodiment, ordinary nodes and controllers do not have respective knowledge maps, and do not understand their respective network contexts. In one embodiment, these ordinary network nodes utilize traditional declarative or imperative policies.

In one embodiment, the semantic model provides a mechanism for validation of configurations within nodes, as well as across multiple nodes in a fabric, and across multiple fabrics in a network topology. This can enable faster fault finding and improved optimization of the network configuration process. In embodiments, once the knowledge map is built at the appropriate level (e.g., at the level of an individual node), newly received declarative policies for the node can be analyzed and parsed in view of the knowledge map to generate semantic transactions used to access a configuration database of the node. In one embodiment, the transactions are formatted according a semantic data query protocol (SDQP). In embodiments, the SDQP transactions are a set of actionable items (e.g., a sequence of configuration commands, actions, and modifications for the configuration database). In an embodiment, because of the knowledge contained in the ontology, the semantic transactions can be more consistent and streamlined, which allows the node to achieve the desired configuration as accurately as possible, with minimized time or resources required (e.g., affecting the minimum number of configuration settings or objects).

In some embodiments, the ontology or knowledge map for a particular node provides information about the relevant context, including the relevant relationships. In one embodiment, as configurations are pushed by the controller, this context is iteratively built or refined. In this way, when each additional configuration is received by the node, it can be analyzed or processed based on the ontology prior to implementation or enforcement of the configuration. In some embodiments, this context is provided through the reasoning of the information and configurations based on their relationships. The reasoning can produce inferences, which help to provide additional "hidden" relationships among the configurations. In some embodiments, these additional inferred relationships are then used to validate or confirm whether new configurations pushed to the node make sense in view of the ontology, and what other places the new configuration is (implicitly) applicable. Thus, in one embodiment, the ontology or context helps to avoid common mistakes in configuration.

FIG. 1 illustrates a network topology 100 configured to use semantic data modeling to manage and enforce network policies, according to one embodiment disclosed herein. In the illustrated embodiment, a Controller 115A controls two Network Nodes 125A and 125B, which are included within a single site or Fabric 118A. Further, as illustrated, a Controller 115B controls Network Nodes 125C and 125D, which belong to a site or Fabric 118B. In one embodiment, the Network Nodes 125A and 125B form a first fabric or site, while the Network Nodes 125C and 125D form a second fabric or site. In embodiments, the Controllers 115A-B push policies to their respective Fabrics 118A and 118B to control the operations of the corresponding nodes. In an embodiment, each Network Node 125 can be a router, switch, gateway, and the like. Further, in embodiments, each Network Node 125 may be implemented using software (e.g., a virtual switch or virtual network function), hardware, or a combination of both hardware and software.

Although two Network Nodes 125 are illustrated in each fabric, in embodiments, there may be any number of nodes in a given site. Further, although two fabrics are illustrated, in embodiments, there may be any number of fabrics deployed in a given topology. In the illustrated embodiment, a Multisite Controller 105 can provide network-wide configurations by pushing policies to the site-specific Controllers 115A and 115B. These policies can then be implemented by the Controller 115, or pushed to the individual network nodes in the respective Fabric 118 that the Controller 115 controls, as discussed below. In the illustrated embodiment, the Multisite Controller 105 includes a Network Ontology 110 that provides a network-level semantic data model of the Multisite Controller 105, and individual Controllers 115A and 115B. In some embodiments, the Network Ontology 110 also includes information about the individual Network Nodes 125A-D.

In some embodiments, however, the Multisite Controller 105 does not use a Network Ontology 110, and operates using traditional methods to configure the Controllers 115A-B. In the illustrated embodiment, the Controller 115B has a Fabric Ontology 120B, while the Controller 115A does not. Of course, in embodiments, Controller 115A may have its own Fabric Ontology 120A, both Controllers 115 may utilize a Fabric Ontology 120, or neither Controller 115 may have an ontology, depending on the particular implementation and topology. In an embodiment, the Fabric Ontology 120B provides information regarding the Fabric 118B (comprising Network Nodes 125C-D), such as their respective configurations, relationships between the Network Nodes 125C-D (and with other nodes which may be outside of the fabric), and the like.

Additionally, in the illustrated embodiment, the Network Nodes 125A and 125C have respective Node Ontologies 130A and 130C, while the Network Nodes 125B and 125D do not. In embodiments, a semantic-aware node (e.g., Network Node 125A or 125C) can be controlled by an ordinary controller (e.g., Controller 115A) or a semantic-aware controller (e.g., Controller 115B). That is, in embodiments, semantic-aware nodes can utilize traditional or ordinary configurations (such as declarative or imperative), as well as semantic configurations. Further, in embodiments, an ordinary node (e.g., Network Node 125B or 125D) can be controlled by an ordinary controller (e.g., Controller 115A) or a semantic-aware controller (e.g., Controller 115B). Moreover, in embodiments, an ordinary controller (e.g., Controller 115A) can be controlled by an ordinary multisite controller (e.g., one without a network ontology), or a semantic-aware multisite controller (e.g., Multisite Controller 105). Similarly, in embodiments, a semantic-aware controller (e.g., Controller 115B) can be controlled by an ordinary multisite controller (e.g., one without a network ontology), or a semantic-aware multisite controller (e.g., Multisite Controller 105).

In the illustrated embodiment, each Network Node 125A-D is associated with a respective Configuration Database 135A-D. In an embodiment, each Configuration Database 135A-D is used to store the configuration for the respective Network Node 125A-D. In one embodiment, the Configuration Database 135 includes the configuration objects (e.g., the MOs) of the respective node. In one embodiment, configuration objects include the physical resources of the node, as well as the virtual resources and allocations or assignments. For example, in an embodiment, one configuration object may be a physical port, while another configuration object is the interface that is assigned to the port. In embodiments, each Network Node 125 interacts with its respective Configuration Database 135 using transactions to add, remove, and modify configuration objects in order to implement the policy provided by the upstream Controller 115. In one embodiment, the semantic transactions (e.g., formatted according to SDQP), can include queries, as well as other transactions or operations, such as create/read/update/delete (CRUD) operations.

In one embodiment, Network Nodes 125B and 125D, which do not utilize a Node Ontology 130, interact with their Configuration Databases 135B and 135D using traditional queries and techniques. In an embodiment, Configuration Databases 135 belonging to traditional nodes are relational databases. In some embodiments, the Configuration Databases 135 that belong to semantic-aware nodes are semantic-aware databases. In embodiments, the semantic-aware Network Nodes 125A and 125C interact with their respective Configuration Databases 135A and 135C using semantic transactions (e.g., SDQP transactions) in order to modify the configuration objects.

Figure 2:
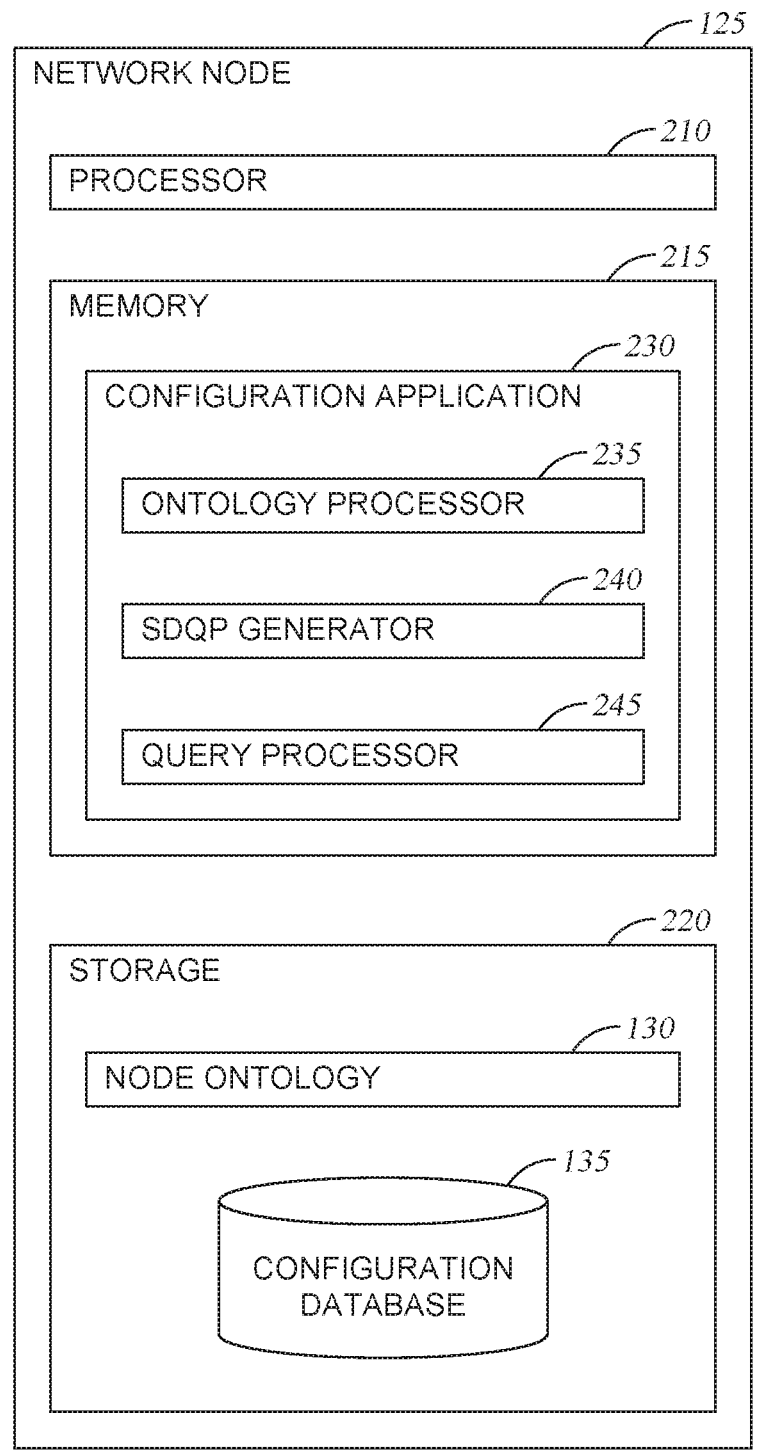
FIG. 2 is a block diagram of a semantic-aware network node configured to use semantic data modeling to manage and enforce network policies, according to one embodiment disclosed herein.

FIG. 2 is a block diagram of a semantic-aware Network Node 125 configured to use semantic data modeling to manage and enforce network policies, according to one embodiment disclosed herein. As illustrated, the Network Node 125 includes a Processor 210, a Memory 215, and Storage 220. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Although not illustrated, in embodiments, the Network Node 125 may also include one or more ports, switching logic (e.g., one or more application specific integrated circuits (ASICs)), network interfaces for connecting to one or more Controllers 115, and the like.

In the illustrated embodiment, the Storage includes a Node Ontology 130 and a Configuration Database 135 for the Network Node 125. Further, the Memory 215 includes a Configuration Application 230. Although illustrated as a software application, in embodiments, the operability of the Configuration Application 230 can be implemented in software, hardware, or a combination of software and hardware. The Configuration Application 230 includes an Ontology Processor 235, an SDQP Generator 240, and a Query Processor 245. In some embodiments, the Ontology Processor 235 analyzes the configuration (e.g., the configuration objects) and/or a system description of the Network Node 125 (e.g., a tree-based data model of the node) to create the Node Ontology 130. In some embodiments, some or all of the Node Ontology 130 is created by a designer or other entity, and is received and processed by the Ontology Processor 235. In embodiments, the Ontology Processor 235 also utilizes constraints or rules associated with the objects in order to build the Node Ontology 130. Further, in some embodiments, the Ontology Processor 235 additionally makes inferences or deductions (e.g., using logical reasoning) regarding the Network Node 125, based on the known objects and relationships, in order to provide additional depth to the Node Ontology 130.

In an embodiment, relationships between configuration objects (which can be provided, or can be inferred) can include priority information, interdependency information, constraint information, sequence information, validation information, information regarding applicability of each configuration object, and the like. In one embodiment, priority information involves the relative priority of each object or configuration state. For example, if two objects or configurations conflict, the priority information can specify which object or configuration should be implemented. Additionally, in one embodiment, interdependency information defines the dependencies between objects. For example, implementing one configuration object (or changing the value or state of the object) may require that another identified configuration object be present (or have a defined state), or that the other object be removed. Similarly, in one embodiment, removing a particular object might require removing one or more other objects, or adding one or more other objects. Further, in an embodiment, sequence information relates to the order with which configuration objects should be implemented or modified. For example, in such an embodiment, one or more configuration objects may be related such that the final configuration of the node may differ depending on the order in which they are modified, added, or removed.

In one embodiment, the SDQP Generator 240 receives policies pushed from the Controller 115, processes and parses them using the Node Ontology 130, and generates one or more SDQP transactions the be executed against the Configuration Database 135 in order to implement the policy. In some embodiments, the policies are declarative policies pushed by the Controller 115. In some embodiments, if the Controller 115 is semantic-aware, it can also push semantic policies (e.g., via SDQP) to the Network Node 125. In such an embodiment, SDQP Generator 240 can further analyze these transactions, based on the Node Ontology 130, to validate them prior to use. For example, in one embodiment, in addition to generating transactions, the SDQP Generator 240 determines a proper ordering of the transactions.

Further, in the illustrated embodiment, the Query Processor 245 implements the generated (or received) semantic transactions by executing them against the Configuration Database 135. In this way, the Configuration Application 230 analyzes policies based on the particular Node Ontology 130 of the node. In some embodiments, the Ontology Processor 235 periodically refines or updates the Node Ontology 130. For example, in one embodiment, the Ontology Processor 235 accesses the Configuration Database 135 or other sources of information in defined intervals (e.g., every hour, every day, and the like). In some embodiments, each time a new configuration is implemented, the Ontology Processor 235 updates the Node Ontology 130 to reflect the current domain and state of the Network Node 125. In this way, when a new policy is received, the Configuration Application 230 can analyze the policy, as compared to the node's current state and context, in order to determine the most optimal series of transactions needed to ensure the node implements the policy accurately and quickly.

In some embodiments, as additional configurations are received (or additional rules or constraints are received or inferred), the Ontology Processor 235 further refines or updates the Node Ontology 130. Further, in some embodiments, real-time events from the network (e.g., signifying the state of the network resources such as interfaces, virtual local area networks (VLANs), bridges, etc.) are also utilized as inputs to the semantic data model. Additionally, in an embodiment, the Ontology Processor 235 can use this real-time information to derive or deduce further inferences or deductions. Thus, the system enables knowledge about the network state to be used to add to the processing of declarative policies coming in from a network controller.

Figure 3:
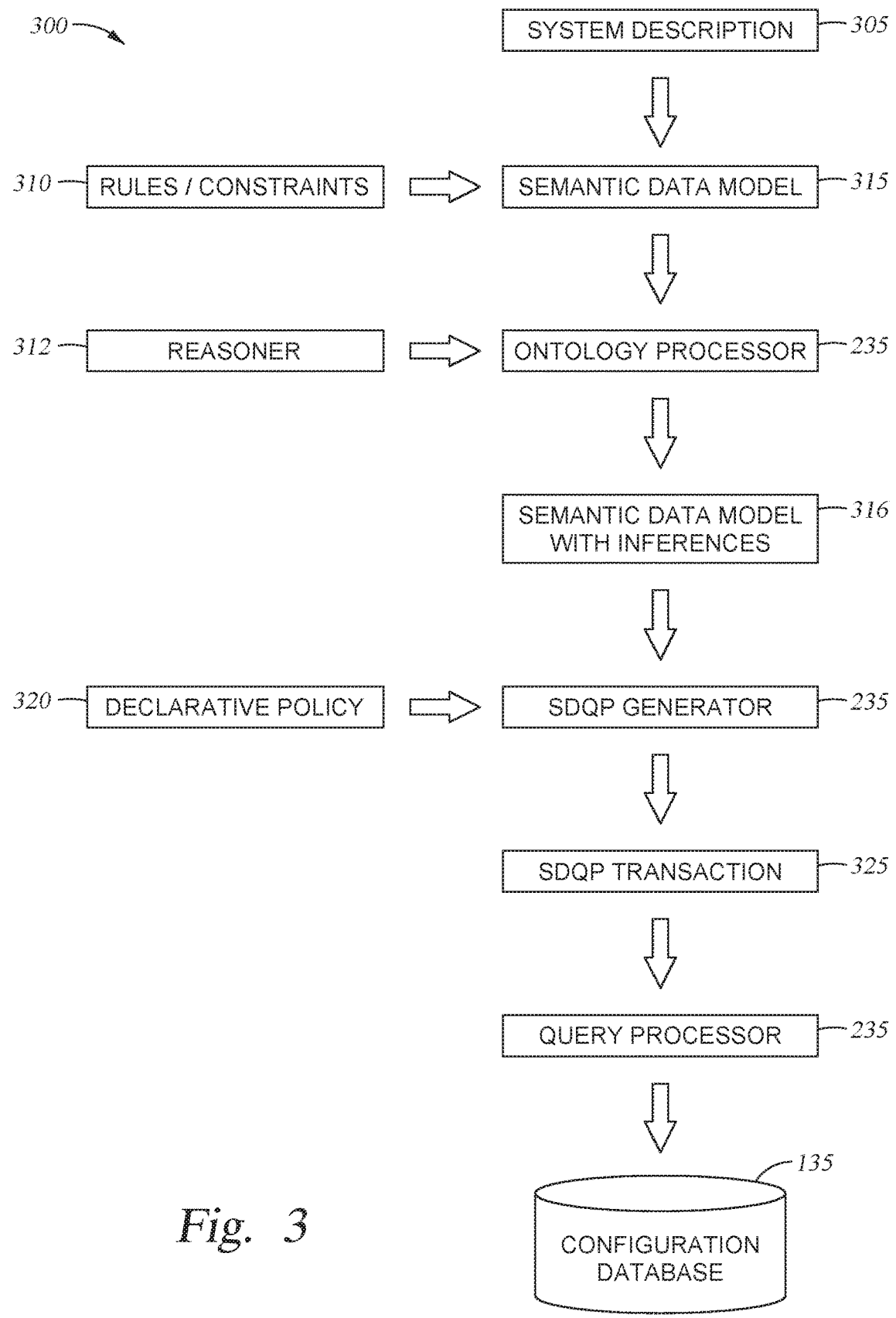
FIG. 3 illustrates a workflow for managing and enforcing network policies using semantic data modeling, according to one embodiment disclosed herein.

FIG. 3 illustrates a workflow 300 for managing and enforcing network policies using semantic data modeling, according to one embodiment disclosed herein. In the illustrated workflow 300, a System Description 305 and a set of Rules/Constraints 310 associated with a network node are used to create a Semantic Data Model 315. In one embodiment, the System Description 305 includes information about the configuration objects of the node, as well as interactions, transformations, and mechanisms used to implement the changes, as well as the ordinary functionality of the node. In some embodiments, the System Description 305 also describes the relationships between configuration objects. In embodiments, the System Description 305 further describes the behavior of the relevant system. As used herein, the System Description 305 refers to the configuration domain of the system (e.g., the node, fabric, or multisite network) that is being configured. Thus, in embodiments, the System Description 305 is often significantly different for different systems or entities. For example, a network switch will have a significantly different configuration domain than a network router.

Further, in an embodiment, the Rules/Constraints 310 include requirements imposed on the node. For example, one such Rule/Constraint 310 may indicate that two configurations (or two configuration objects) are mutually exclusive. Similarly, a rule or constraint can indicate that a particular modification is only permissible if made by the Controller 115, while other objects are modifiable by a user (e.g., via a CLI). In an embodiment, while the System Description 305 captures relationships among managed objects, the Rules/Constraints 310 act to fill gaps in the semantic data model. In some embodiments, the Rules/Constraints 310 allow the Ontology Processor 235 to make the system more fault tolerant. For example, in an embodiment, the Rules/Constraints 310 capture the potential configuration related issues early in the configuration process (i.e. before they reach the individual devices).

In some embodiments, the Semantic Data Model 315 is created by a designer, administrator, or architect of the system. In some embodiments, however, the Ontology Processor 235 creates the Semantic Data Model 315. As illustrated, the Ontology Processor 235 then generates a Semantic Data Model with Inferences 316 (e.g., a Node Ontology 130, Fabric Ontology 120, or a Network Ontology 110). In an embodiment, the Semantic Data Model with Inferences 316 includes the configuration objects of the system, as well as the relationships and constraints that interconnect them. In the illustrated embodiment, a Reasoner 312 aids the Ontology Processor 235 in making these inferences or deductions. In embodiments, as part of constructing the Semantic Data Model 315 (or after receiving a Semantic Data Model 315), the Ontology Processor 235 also determines or predicts new rules via inference or deduction. For example, in one embodiment, the Ontology Processor 235 and/or Reasoner 312 can deduce that two configuration settings are mutually exclusive. Similarly, in an embodiment, the Ontology Processor 235 can determine that some configuration objects are only modifiable by the entity who originally created or modified it (e.g., by a particular controller, a particular user, any user, and the like).

In the illustrated workflow 300, this Semantic Data Model with Inferences 316 is provided to the SDQP Generator 235 to be used in analyzing received policies. As illustrated, the SDQP Generator 235 receives a Declarative Policy 320 from the Controller 115, and generates one or more SDQP Transactions 325 based on the Semantic Data Model with Inferences 316. For example, suppose the Declarative Policy 320 instructs the node to configure a VLAN on an interface. Suppose further that the Semantic Data Model with Inferences 316 includes/indicates a relationship between interface(s) and VLAN(s), such as that a given VLAN can have one or more interfaces assigned to it only once, or that an interface can be assigned to a VLAN only once. In such an embodiment, the SDQP Transactions 325 may include a check to see if the given interface (specified in the configuration) is already assigned to the VLAN. Additionally, in some embodiments, this "assignment" operation can also be idempotent in the sense that even if a configuration specifies to assign an interface to a VLAN to which it is already assigned, the node will not change the state of the VLAN (i.e. it will not have double assignment of that interface).

As illustrated, the Query Processor 235 then receives these generated SDQP Transactions 325, and implements them by querying the Configuration Database 135. In this way, embodiments of the present disclosure enable a semantic-aware node to interpret declarative policies in the context of their own configuration and relationships, via the knowledge map or Semantic Data Model 315 (or Semantic Data Model with Inferences 316), adjust the node's configuration via streamlined and efficient SDQP transactions.

Figure 4:
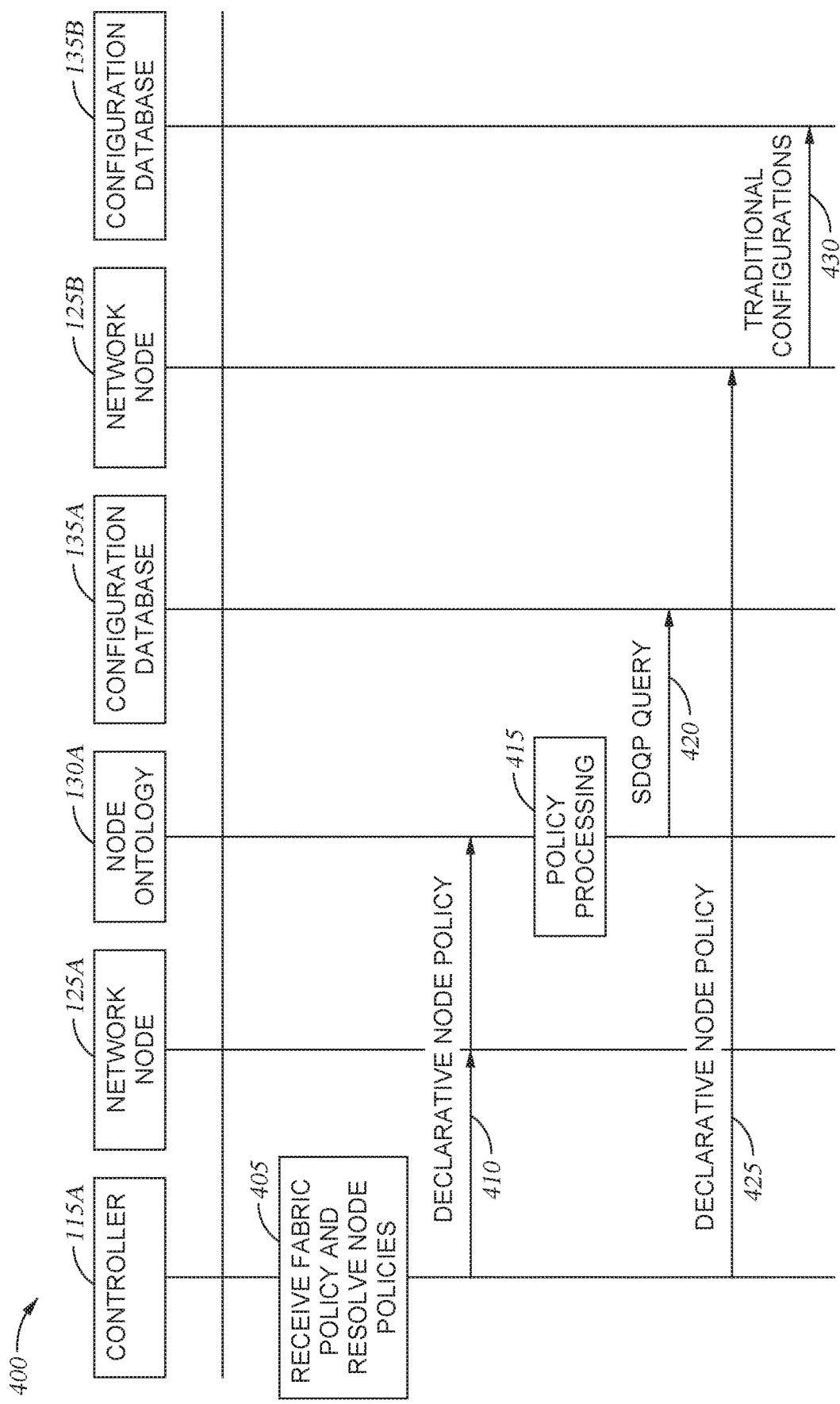
FIG. 4 illustrates a workflow for using a node-level ontology to manage and enforce network policies, according to one embodiment disclosed herein.

FIG. 4 illustrates a workflow 400 for using a node-level ontology to manage and enforce network policies, according to one embodiment disclosed herein. In the illustrated embodiment, the Controller 115A does not utilize a fabric ontology, and pushes declarative policies to Network Nodes 125A and 125B. Further, as illustrated, Network Node 125A utilizes a Node Ontology 130A, while Network Node 125B does not. The workflow 400 begins at block 405, when the Controller 115A receives a fabric-level policy, and resolves the individual node policies. That is, in the illustrated embodiment, the Controller 115A receives a declarative policy from a user, administrator, or Multisite Controller 105.

Further, in the illustrated embodiment, the fabric-level policy instructs the Controller 115A to implement the policy in the fabric, but does provide specific or actionable steps to take to do so. Thus, as illustrated, the Controller 115A resolves the broader policy into individual node-level policies. For example, in an embodiment, the Controller 115A determines which nodes should be modified in order to implement the policy, and what policy or policies should be pushed to each identified node, in accordance with the fabric-level policy. In some embodiments, rather than receiving a fabric-level policy, the Controller 115A receives predefined node policies, which it pushes to the respective Network Nodes 125A and 125B.

As illustrated by arrow 410, the Controller 115A pushes a declarative node-level policy to the Network Node 125A, which analyzes it in view of the Node Ontology 130A. At block 415, the Network Node 125A processes the declarative policy based on the Node Ontology 130A, in order to generate one or more concrete SDQP transactions that can be used to implement the policy. As discussed above, in embodiments, the SDQP transactions are semantic, and are based in part on the Node Ontology 130A, which describes the objects and relationships that define the Network Node 125A. In this way, the SDQP transactions provide additional consistency and efficiency. As illustrated by arrow 420, the policy is then implemented by querying the Configuration Database 135A using the generated SDQP transactions.

Additionally, as illustrated by arrow 425, the Controller 115A pushes a declarative policy to the Network Node 125B. As discussed above, in the illustrated embodiment, the Network Node 125B lacks a node ontology (e.g., it is an ordinary node). Thus, as illustrated by arrow 430, the Network Node 125B implements the policy using traditional configuration techniques. In an embodiment, this may require additional ordinary queries (e.g., to determine the state of the Network Node 125B), which are not SDQP transactions, as compared to the transactions required by a semantic-aware node, and may further lead to inaccurate or inefficient results. For example, because the Network Node 125B lacks an ontology and is not aware of its own structure, one or more of the traditional queries may be out of order, or may be unnecessary to implement the policy.

Figure 5:
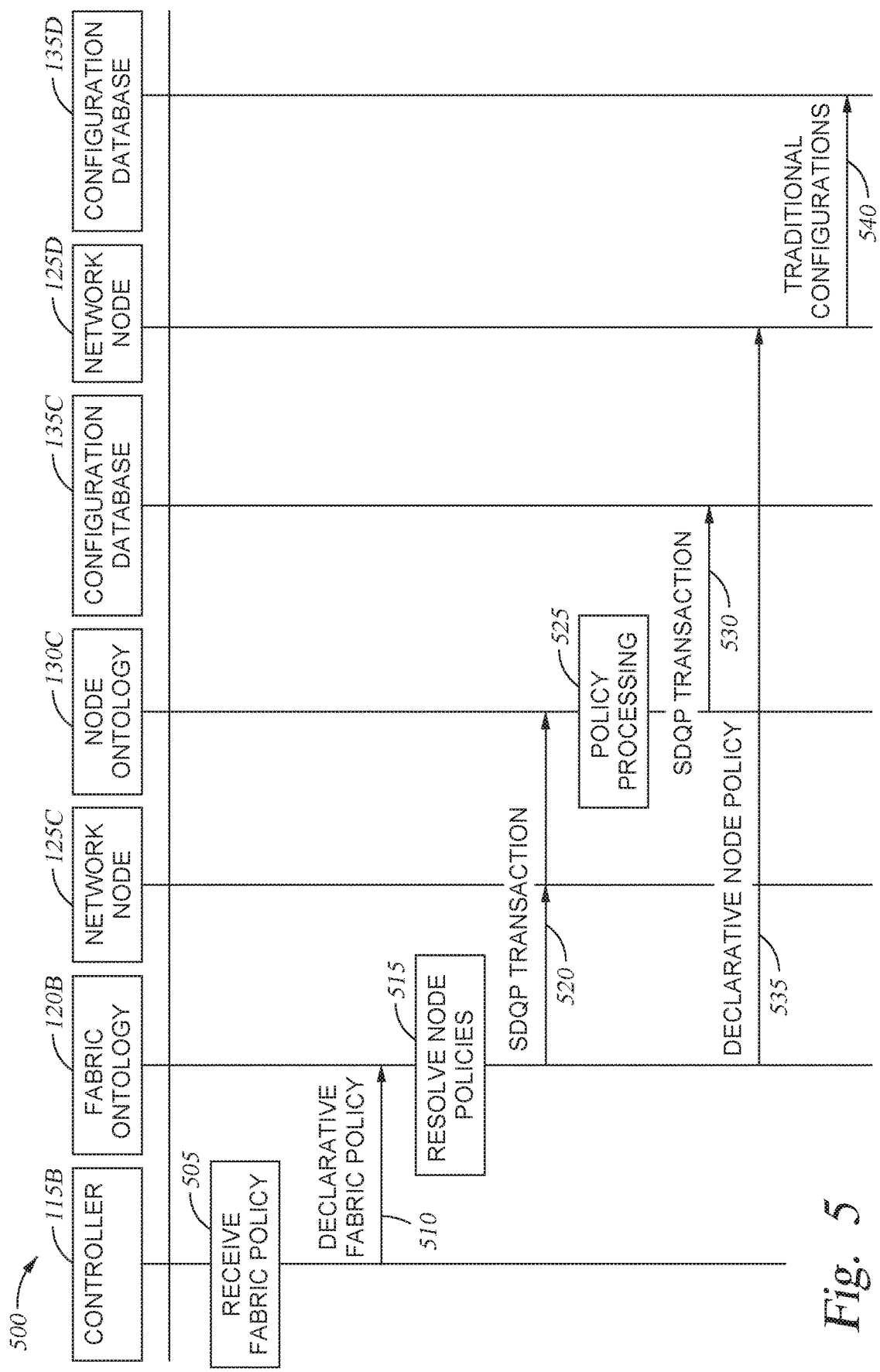
FIG. 5 illustrates a workflow for using a fabric-level ontology to manage and enforce network policies, according to one embodiment disclosed herein.

FIG. 5 illustrates a workflow 500 for using a fabric-level ontology to manage and enforce network policies, according to one embodiment disclosed herein. In the illustrated embodiment, the Controller 115B has a Fabric Ontology 120B, which describes the objects and relationships between the Network Nodes 125C and 125D, such that the Controller 1158 has a broader understanding of the state of the fabric. Further, as illustrated, Network Node 125C utilizes a Node Ontology 130C while Network Node 125D does not. The workflow 500 begins at block 505, when the Controller 115B receives a declarative fabric-level policy. That is, in the illustrated embodiment, the Controller 115B receives a declarative policy from a user, administrator, or Multisite Controller 105.

Further, in the illustrated embodiment, the fabric-level policy instructs the Controller 115B to implement the policy in the fabric, but does provide specific or actionable steps to take to do so. Thus, as illustrated by arrow 510, the Controller 1158 forwards the declarative policy to be resolved via the Fabric Ontology 120B. At block 515, the Controller 1158 resolves the broader policy into individual node-level policies. For example, in an embodiment, the Controller 1158 determines which nodes should be modified in order to implement the policy, and what the content each policy should be for each identified node. Further, in the illustrated embodiment, the Controller 1158 determines the structure or format of the policies, based on whether the underlying Network Node 125 is a semantic-aware node or not. In some embodiments, rather than receiving a fabric-level policy, the Controller 1158 receives individual node policies, which it pushes to the respective Network Nodes 125C and 125D.

As illustrated by arrow 520, the Controller 1158 pushes a node-level semantic policy via SDQP transactions to the Network Node 125C. That is, in the illustrated embodiment, the Controller 1158 utilizes SDQP because its Fabric Ontology 120B indicates that the Network Node 125C is a semantic-aware node, which can receive and understand SDQP. Further, in some embodiments, the Fabric Ontology 120B includes all or part of the Node Ontology 130C, such that the semantic policy can be more efficient, less ambiguous, and better targeted to the Network Node 125C. In some embodiments, the SDQP transactions transmitted at arrow 520 inform the Network Node 125C as to the broader intent of the policy, in order to ensure the Network Node 125C implements it correctly.

In the illustrated embodiment, the Network Node 125C further analyzes the semantic policy in view of its Node Ontology 130C. At block 525, the Network Node 125C processes the SDQP policy based on the Node Ontology 130C, in order to generate one or more concrete SDQP transactions that can be used to implement the policy. In some embodiments, this comprises generating new SDQP transactions that are specific for the Network Node 125C, based on the semantic information contained in the SDQP data sent by the Controller 115B. In one embodiment, processing the policy comprises validating or confirming that the SDQP transactions provided by the Controller 115B will work on the Network Node 125C, and will implement the desired policy. In some embodiments, the Network Node 125C may modify one or more of the transactions, re-order them, refrain from executing one or more, or decide to implement one or more additional transactions. Finally, as illustrated by arrow 530, the policy is then implemented by executing the SDQP transactions against the Configuration Database 135C.

Additionally, as illustrated by arrow 535, the Controller 1156 pushes a declarative policy to the Network Node 125D. As discussed above, in the illustrated embodiment, the Network Node 125D lacks a node ontology. In the illustrated embodiment, the Controller 1156 understands this based on its Fabric Ontology 120B, and thus determines to push a declarative policy to the Network Node 125D, rather than a semantic policy. Thus, as illustrated by arrow 540, the Network Node 125D implements the policy using traditional configuration techniques.

Figure 6:
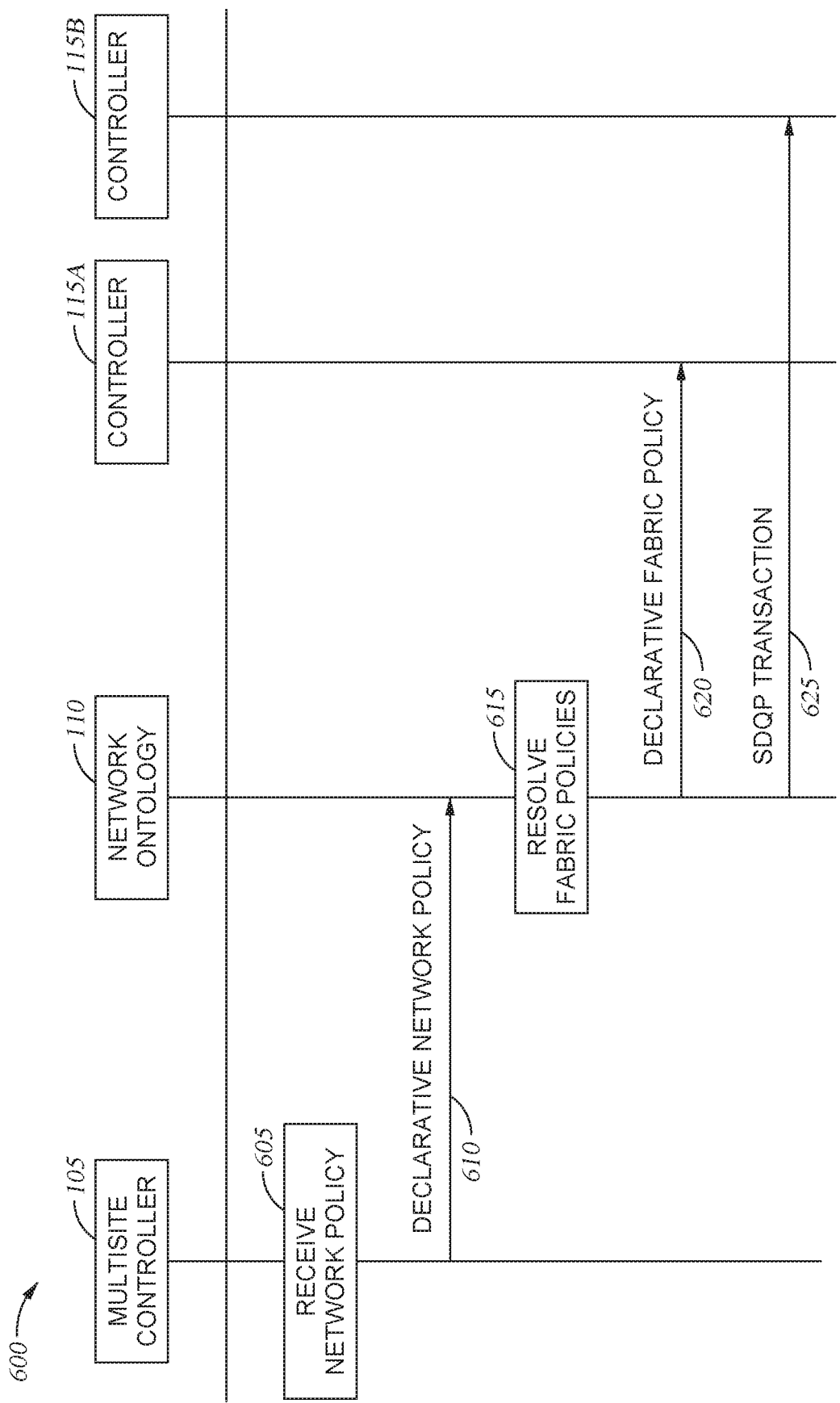
FIG. 6 illustrates a workflow for using a multisite network-level ontology to manage and enforce network policies, according to one embodiment disclosed herein.

FIG. 6 illustrates a workflow 600 for using a network-level ontology to manage and enforce network policies, according to one embodiment disclosed herein. In the illustrated embodiment, the Multisite Controller 105 has a Network Ontology 110, which describes the objects and relationships between the individual fabrics or sites. For example, in one embodiment, the Network Ontology 110 defines which Network Nodes 125 are in which fabric, how they are connected, which Controllers 115 control them, which devices are semantic-aware, what configuration(s) and relationships are present, and the like. In this way, the Controller 115B has a broader and more complete understanding of the network. Further, as discussed above, the Controller 115B utilizes a Fabric Ontology 120B, while Controller 115A does not. The workflow 600 begins at block 605, where the Multisite Controller 105 receives a declarative network-level policy. That is, in the illustrated embodiment, the Multisite Controller 105 receives a declarative policy from a user, administrator, or other controller.

Further, in the illustrated embodiment, the network-level policy instructs the Multisite Controller 105 to implement the policy in the network by configuring the individual fabrics, but does provide specific or actionable steps to take to do so. Thus, as illustrated by arrow 610, the Multisite Controller 105 forwards the declarative policy to be resolved via the Network Ontology 110. At block 615, the Multisite Controller 105 resolves the broader policy into individual fabric-level policies. For example, in an embodiment, the Multisite Controller 105 determines which fabrics should be modified in order to implement the policy, and what policy should be pushed to each identified fabric. Further, in the illustrated embodiment, the Multisite Controller 105 determines the structure or format of the policies, based on whether the Controller 115 for the identified fabric is a semantic-aware controller or not. In some embodiments, rather than receiving a network-level policy, the Multisite Controller 105 receives individual fabric policies, which it processes and pushes to the respective Controllers 115A and 115B.

As illustrated by arrow 625, the Multisite Controller 105 pushes a fabric-level semantic policy via SDQP transactions to the Controller 115B. That is, in the illustrated embodiment, the Multisite Controller 105 utilizes SDQP because its Network Ontology 110 indicates that the Controller 115B is a semantic-aware controller, which can receive and understand SDQP. Further, in some embodiments, the Network Ontology 110 includes all or part of the Fabric Ontology 120B, such that the semantic policy can be more efficient, less ambiguous, and better targeted to the Controller 115B. In some embodiments, the SDQP transactions transmitted at arrow 625 inform the Controller 115B as to the broader intent of the policy, in order to ensure the Controller 115B implements it correctly on the nodes.

Additionally, as illustrated by arrow 620, the Multisite Controller 105 pushes a declarative policy to the Controller 115A. As discussed above, in the illustrated embodiment, the Controller 115A lacks a node ontology. In the illustrated embodiment, the Multisite Controller 105 understands this based on its Network Ontology 110, and thus determines to push a declarative policy to the Controller 115A, rather than a semantic policy. Notably, in embodiments, a configuration change may be pushed as a declarative policy (e.g., from a controller to a node), and interpreted and implemented as a semantic policy by the node. Further, in some embodiments, a semantic policy can be pushed to a node (e.g., from the Multisite Controller 105 to the Controller 115B), where it is converted back into a declarative policy (e.g., to be pushed to Network Node 125D).

Figure 7:
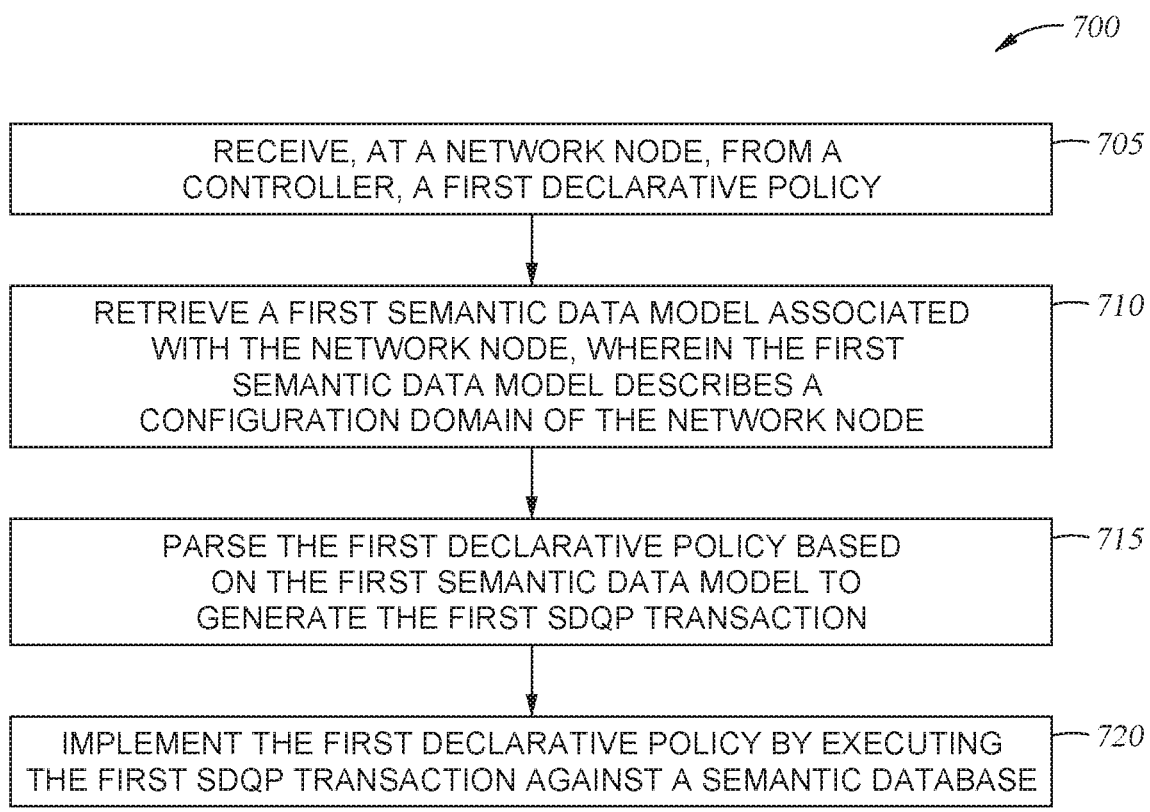
FIG. 7 is a flow diagram illustrating a method of managing and enforcing network policies using semantic data modeling, according to one embodiment disclosed herein.

FIG. 7 is a flow diagram illustrating a method 700 of managing and enforcing network policies using semantic data modeling, according to one embodiment disclosed herein. The method 700 begins at block 705, where a Network Node 115 receives, from a controller, a first declarative policy. The method 700 then proceeds to block 710, where the Network Node 115 generates a first SDQP transaction by retrieving a first semantic data model associated with the network node, wherein the first semantic data model describes a configuration domain of the network node. Further, at block 715, the Network Node 115 parses the first declarative policy based on the first semantic data model to generate the first SDQP transaction. Finally, the method 700 continues to block 720, where the Network Node 115 implements the first declarative policy by executing the first SDQP transaction against a semantic database.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Configuration Application 230) or related data available in the cloud. For example, the Configuration Application 230 could execute on a computing system in the cloud and generate ontologies for various levels of the network (e.g., at the network level, at the fabric level, and at the node level). In such a case, the Configuration Application 230 could generate semantic data models and store the ontologies at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving, at a network node, from a controller, a first declarative policy;
   generating a first semantic data query protocol (SDQP) transaction by:
   retrieving a first semantic data model associated with the network node, wherein the first semantic data model describes a configuration domain of the network node; and
   parsing the first declarative policy based on the first semantic data model to generate the first SDQP transaction, wherein parsing the first declarative policy comprises interpreting the first declarative policy based on a current configuration of the network node, as indicated by the first semantic data model, to generate a sequence of configuration actions; and
   implementing the first declarative policy by executing the first SDQP transaction against a semantic database.

2. The method of claim 1, wherein the configuration domain of the network node includes a plurality of configuration objects and relationships among the plurality of configuration objects.

3. The method of claim 2, wherein the relationships among the plurality of configuration objects includes at least one of: (i) priority information, (ii) interdependency information, (iii) constraint information, and (iv) sequence information.

4. The method of claim 1, the method further comprising:
receiving a system description of the network node, wherein the system description includes a set of configuration objects;
determining a set of relationships among the set of configuration objects; and
generating the first semantic data model for the network node based on the set of configuration objects and the set of relationships.

5. The method of claim 1, the method further comprising:
receiving a semantic policy from a controller via a second SDQP transaction; and
implementing the semantic policy by querying a semantic database using the second SDQP transaction.

6. The method of claim 5, wherein the semantic policy was generated by the controller by:
retrieving a second semantic data model associated with a network fabric, wherein the network fabric includes the network node, and wherein the second semantic data model describes a configuration domain of the network fabric; and
parsing a second declarative policy based on the second semantic data model to generate the second SDQP transaction.

7. The method of claim 6, wherein the second semantic data model was generated by the controller by:
receiving a system description of the network fabric, wherein the system description includes a set of configuration objects for the network fabric;
determining a set of relationships among the set of configuration objects; and
generating the second semantic data model for the network node based on the set of configuration objects and the set of relationships.

8. A network node comprising:
one or more computer processors; and
a memory containing a program which when executed by the one or more computer processors performs an operation, the operation comprising:
receiving, from a controller, a first declarative policy;
generating a first semantic data query protocol (SDQP) transaction by:
retrieving a first semantic data model associated with the network node, wherein the first semantic data model describes a configuration domain of the network node; and
parsing the first declarative policy based on the first semantic data model to generate the first SDQP transaction, wherein parsing the first declarative policy comprises interpreting the first declarative policy based on a current configuration of the network node, as indicated by the first semantic data model, to generate a sequence of configuration actions; and
implementing the first declarative policy by executing the first SDQP transaction against a semantic database.

9. The network node of claim 8, wherein the configuration domain of the network node includes a plurality of configuration objects and relationships among the plurality of configuration objects.

10. The network node of claim 9, wherein the relationships among the plurality of configuration objects includes at least one of: (i) priority information, (ii) interdependency information, (iii) constraint information, and (iv) sequence information.

11. The network node of claim 8, the operation further comprising:
receiving a system description of the network node, wherein the system description includes a set of configuration objects;
determining a set of relationships among the set of configuration objects; and
generating the first semantic data model for the network node based on the set of configuration objects and the set of relationships.

12. The network node of claim 8, the operation further comprising:
receiving a semantic policy from a controller via a second SDQP transaction; and
implementing the semantic policy by querying a semantic database using the second SDQP transaction.

13. The network node of claim 12, wherein the semantic policy was generated by the controller by:
retrieving a second semantic data model associated with a network fabric, wherein the network fabric includes the network node, and wherein the second semantic data model describes a configuration domain of the network fabric; and
parsing a second declarative policy based on the second semantic data model to generate the second SDQP transaction.

14. The network node of claim 13, wherein the second semantic data model was generated by the controller by:
receiving a system description of the network fabric, wherein the system description includes a set of configuration objects for the network fabric;
determining a set of relationships among the set of configuration objects; and
generating the second semantic data model for the network node based on the set of configuration objects and the set of relationships.

15. A computer product comprising logic encoded in a non-transitory medium, the logic executable by operation of one or more computer processors to perform an operation comprising:
receiving, at a network node, from a controller, a first declarative policy;
generating a first semantic data query protocol (SDQP) transaction by:
retrieving a first semantic data model associated with the network node, wherein the first semantic data model describes a configuration domain of the network node; and
parsing the first declarative policy based on the first semantic data model to generate the first SDQP transaction, wherein parsing the first declarative policy comprises interpreting the first declarative policy based on a current configuration of the network node, as indicated by the first semantic data model, to generate a sequence of configuration actions; and
implementing the first declarative policy by executing the first SDQP transaction against a semantic database.

16. The computer product of claim 15, wherein the configuration domain of the network node includes a plurality of configuration objects and relationships among the plurality of configuration objects, wherein the relationships among the plurality of configuration objects includes at least one of: (i) priority information, (ii) interdependency information, (iii) constraint information, and (iv) sequence information.

17. The computer product of claim 15, the operation further comprising:
    receiving a system description of the network node, wherein the system description includes a set of configuration objects;
    determining a set of relationships among the set of configuration objects; and
    generating the first semantic data model for the network node based on the set of configuration objects and the set of relationships.

18. The computer product of claim 15, the operation further comprising:
    receiving a semantic policy from a controller via a second SDQP transaction; and
    implementing the semantic policy by querying a semantic database using the second SDQP transaction.

19. The computer product of claim 18, wherein the semantic policy was generated by the controller by:
    retrieving a second semantic data model associated with a network fabric, wherein the network fabric includes the network node, and wherein the second semantic data model describes a configuration domain of the network fabric; and
    parsing a second declarative policy based on the second semantic data model to generate the second SDQP transaction.

20. The computer product of claim 19, wherein the second semantic data model was generated by the controller by:
    receiving a system description of the network fabric, wherein the system description includes a set of configuration objects for the network fabric;
    determining a set of relationships among the set of configuration objects; and
    generating the second semantic data model for the network node based on the set of configuration objects and the set of relationships.

\* \* \* \* \*